(12) United States Patent
Li

(10) Patent No.: US 10,236,488 B2
(45) Date of Patent: Mar. 19, 2019

(54) BATTERY PACK

(71) Applicant: CONTEMPORARY AMPEREX TECHNOLOGY CO., LIMITED, Ningde, Fujian Province (CN)

(72) Inventor: Qing Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 98 days.

(21) Appl. No.: 15/298,991

(22) Filed: Oct. 20, 2016

(65) Prior Publication Data
US 2017/0256764 A1 Sep. 7, 2017

(30) Foreign Application Priority Data
Mar. 3, 2016 (CN) .......................... 2016 1 0120807

(51) Int. Cl.
*H01M 2/10* (2006.01)
*H01M 10/6567* (2014.01)
(Continued)

(52) U.S. Cl.
CPC .......... *H01M 2/1094* (2013.01); *H01M 2/10* (2013.01); *H01M 2/1077* (2013.01); *H01M 2/12* (2013.01);
(Continued)

(58) Field of Classification Search
CPC ........ H01M 2/10; H01M 10/42; H01M 10/48; H01M 2/12; H01M 2220/20
See application file for complete search history.

(56) References Cited

U.S. PATENT DOCUMENTS

2002/0197527 A1* 12/2002 Moores, Jr. ............. B25F 5/008
429/120
2011/0290554 A1* 12/2011 Bogner ............... H01M 2/1094
174/547
(Continued)

FOREIGN PATENT DOCUMENTS

CN 103326085 A 9/2013
CN 104795514 A 7/2015
(Continued)

OTHER PUBLICATIONS

Decision to Grant a Patent issued by JPO dated Apr. 3, 2018 (Year: 2018).*
(Continued)

*Primary Examiner* — Alexander Usyatinsky
(74) *Attorney, Agent, or Firm* — Tucker Ellis LLP

(57) ABSTRACT

The present application relates to the field of battery technologies and, particularly, relates to a battery pack, which includes a battery box, a battery module and a liquid cooling pipe are arranged inside the battery box and the liquid cooling pipe is arranged at bottom of the battery module, a moisture absorbing area is arranged inside the battery box and the moisture absorbing area is configured to absorb inner moisture of the battery box. The present application has the following beneficial effects: the battery box of the present application adopts a passive moisture-removing function and achieves controlling of the air humidity in the battery box, thereby guaranteeing the reliability of the battery system, and reducing the risk of failure of the electric components.

8 Claims, 1 Drawing Sheet

(51) Int. Cl.
- *H01M 10/613* (2014.01)
- *H01M 10/6556* (2014.01)
- *H01M 2/12* (2006.01)
- *H01M 10/42* (2006.01)
- *H01M 10/48* (2006.01)
- *H01M 10/625* (2014.01)

(52) U.S. Cl.
CPC ......... *H01M 10/425* (2013.01); *H01M 10/48* (2013.01); *H01M 10/613* (2015.04); *H01M 10/6556* (2015.04); *H01M 10/6567* (2015.04); *H01M 10/625* (2015.04); *H01M 2220/20* (2013.01)

(56) References Cited

U.S. PATENT DOCUMENTS

| | | | |
|---|---|---|---|
| 2012/0193068 A1* | 8/2012 | Nemesh | B60L 11/1812 165/41 |
| 2013/0252043 A1* | 9/2013 | Allison | H01M 2/1077 429/72 |
| 2014/0134469 A1 | 5/2014 | Damon | |

FOREIGN PATENT DOCUMENTS

| | | |
|---|---|---|
| CN | 104821419 A | 8/2015 |
| DE | 10 2014 200789 A1 | 7/2015 |
| JP | 2005149837 A | 6/2005 |
| JP | 2009110829 A | 5/2009 |
| JP | 2010129392 A | 6/2010 |
| JP | 2011049139 A | 3/2011 |
| JP | 2014225426 A | 12/2014 |

OTHER PUBLICATIONS

JP2012094313 MT (Year: 2012).*
CN 104795514 MT.*
Office Action from counterpart Chinese Patent Application No. 201610120807.8, dated Oct. 9, 2017.
Office Action from counterpart Japanese Patent Application No. 2016-112117, dated Dec. 12, 2017.
Extended European Search Report from counterpart European Patent Application No. 16191162.3, dated Dec. 8, 2016.
Office Action and machine translation from corresponding Japanese Patent Application No. 2016-112117, dated Jun. 13, 2017.
Office Action of corresponding Chinese Application No. 201610120807.8, dated Mar. 29, 2018; 13 pages including machine translation.

* cited by examiner

BATTERY PACK

CROSS-REFERENCE TO RELATED APPLICATIONS

The present application claims priority to Chinese Patent Application No. 201610120807.8, filed on Mar. 3, 2016, the content of which is incorporated herein by reference in its entirety.

TECHNICAL FIELD

The present application relates to the field of battery technologies and, particularly, to a battery pack with dehumidification function.

BACKGROUND

Referring to Chinese Patent publication No. 104821419, which discloses a battery pack thermal management device of an electric vehicle, the device includes a fan, an evaporator, a battery module and heat preserving cotton. A silica gel heating film is provided between the battery module and a cooling plate. The cooling plate adopts a structure of plate machine plus flow passage. The evaporator and the cooling plate are connected and used in series, the cold air of the evaporator certainly needs an air pipeline or an air passage so as to be sent into the battery box, thereby implementing that the outer cold air enters into the box to cool the battery. When heating, the temperature of the large amount of cold air in the battery box and the air pipeline rises after being heated, and then forms hot gas, which will flow inside the battery box, and forms condensate water when meeting solid wall surfaces with low temperature. Referring to Chinese Patent publication No. 103326085, which discloses a Li-ion power battery pack, including a battery box, an inlet pipe, a top cover plate, a single battery, an outlet pipe and a liquid cooling pipe. A battery box heat preserving layer is adhered on the inner wall of the battery box. A module heat preserving layer is adhered at the surface of the battery module. Phase-change material is filled between the cooling pipe and the single battery.

At present, the Li-ion battery performs best charge-discharge performance and longest service life when the temperature is within the range of 20-40 degrees. However, generally in the market, the thermal management system is adopted to keep the battery pack working in the best working range, so as to provide best driving experience to customers. The manner of the thermal management system includes solutions of initiative air cooling and air heating, and liquid cooling and liquid heating etc. If the evaporator of initiative air cooling or the water cooling plate of liquid cooling is arranged in the airtight interior of the battery box, phenomenon of high-temperature moisture condensation will occur on the surface of the evaporator and the surface of the cooling plate. In low-temperature environment, when the hot air sent by the air heating manner and the hot air heated by hot water meets the cold condensate water, which has the risk of permeating into the electronic management system, results in failure of the electron devices, for example, short circuit may be caused by the condensate water of the hot gas in the cell supervision circuit (CSC) in the battery box, causing breakdown of the whole battery management system, which leads to operation malfunction of the vehicle.

Therefore, it is needed to provide a new battery pack, so as to overcome the above defects.

SUMMARY

The objective of the present application is to provide a battery box, which can prevent and solve the problem of battery system failure caused by the moisture condensation and cooling liquid leakage occurred in the battery box, so as to reduce the safety risk.

The objective of the present application is achieved through the following technical solution: a battery pack, including a battery box, a battery module and a liquid cooling pipe are arranged inside the battery box, the liquid cooling pipe is arranged at bottom of the battery module, an moisture absorbing area is arranged inside the battery box, the moisture absorbing area is configured to absorb inner moisture of the battery box.

Further, the moisture absorbing area is arranged on a box top cover of the battery box, so as to avoid condensation water formed on the box top cover from dropping into electronic and electrical components.

Further, a flow converging plate is arranged in the battery box, the flow converging plate is fixedly connected with a box side plate of the battery box.

Further, an accumulated liquid absorbing area is arranged in the battery box, the accumulated liquid absorbing area is arranged at bottom of the flow converging plate, liquid and moisture absorbing material adopted in the accumulated liquid absorbing area has certain saturability, the accumulated liquid absorbing area and the flow converging plate cooperate to aggregate condensation water and the cooling liquid leaked from the liquid cooling pipe.

Further, an air pressure balance valve is arranged at a box side plate of the battery box, the air pressure balance valve includes a multi-hole ventilating and moisture absorbing sheet and an air pressure balance valve diaphragm, the multi-hole ventilating and moisture absorbing sheet is arranged at front and back of the air pressure balance valve diaphragm.

Further, absorbing capacity of the multi-hole ventilating and moisture absorbing sheet arranged towards outside of the battery box is higher than absorbing capacity of the multi-hole ventilating and moisture absorbing sheet arranged towards inside of the battery box.

Further, the air pressure balance valve also includes a detachable dust-removal filtering net configured to absorb and remove dust, the dust-removal filtering net is arranged at outside of the multi-hole ventilating and moisture absorbing sheet arranged towards outside of the battery box.

Further, the moisture absorbing area is integrated as a multi-hole ventilating and moisture absorbing structure, which adopts chemical moisture absorbing material particles or a foaming structure with larger interior than surface.

Further, a cell supervision circuit is also arranged in the battery box, socket direction of the cell supervision circuit is perpendicular to gravity direction.

Comparing to the prior art, the present application has the following beneficial effects: the battery box of the present application adopts a passive moisture-removing function, achieves controlling of the air humidity in the battery box, thereby guaranteeing the reliability of the battery system, and reducing the risk of failure of the electric components.

| Reference sign of main assemblies | | | |
|---|---|---|---|
| Battery box | 1 | Battery module | 2 |
| Box top cover | 3 | Box bottom plate | 4 |
| Flow converging plate | 5 | Cell supervision circuit | 6 |
| Air pressure balance valve | 7 | Accumulated liquid absorbing area | 8 |
| Moisture absorbing area | 9 | Humidity detecting probe | 10 |
| Liquid cooling pipe | 11 | Water releasing valve | 12 |

The present application will be further illustrated by the following embodiments with reference to the above accompanying drawings.

DESCRIPTION OF EMBODIMENTS

Hereinafter, embodiments of the battery pack of the present application will be introduced with reference to FIG. 1 and FIG. 2.

Figure 1:
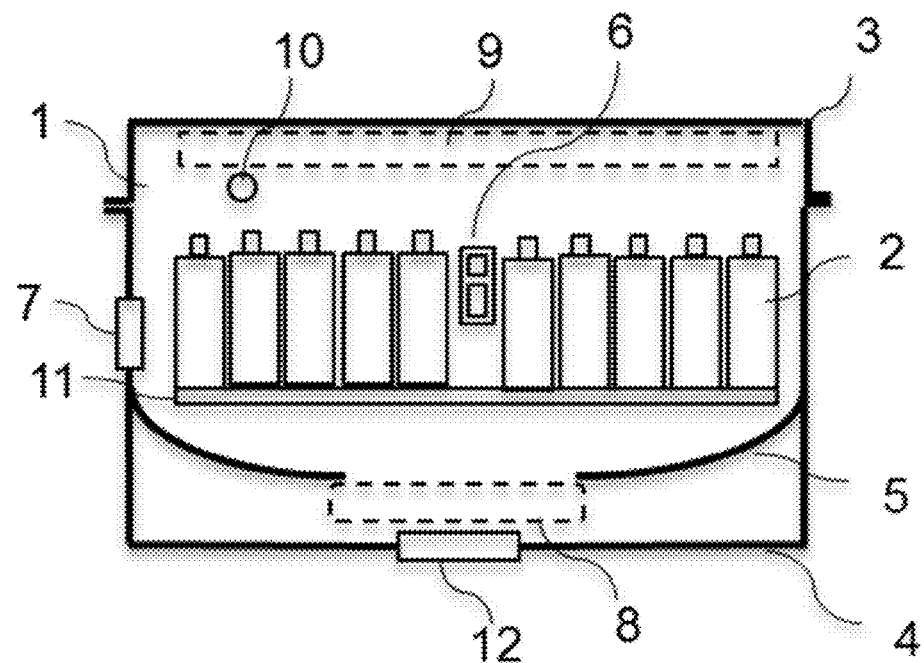
FIG. 1 is a schematic diagram of a battery pack according to the present application.
Figure 2:
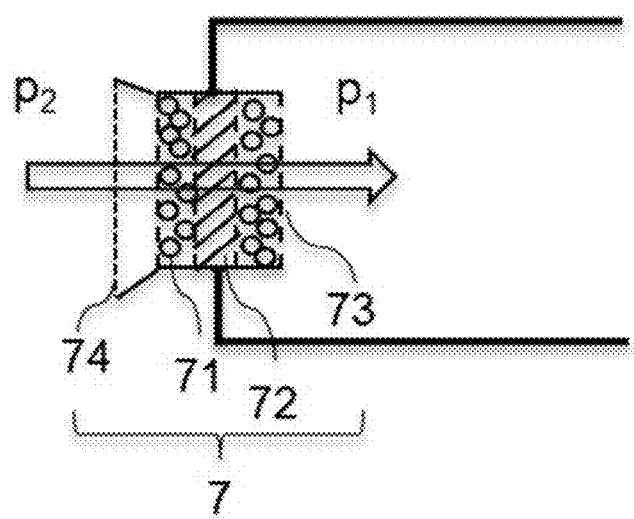
FIG. 2 is a schematic diagram of an air pressure balance valve of a battery pack according to the present application.

As shown in FIG. 1, the present application provides a battery pack, including a battery box 1, a battery module 2 arranged in the battery box 1, a flow converging plate 5 and a cell supervision circuit 6 arranged between the battery modules 2, the battery box 1 has a box top cover 3 arranged on an upper end thereof and a box bottom plate 4 arranged at the bottom thereof, an air pressure balance valve 7 is arranged on a box side plate of the battery box 1, a water releasing valve 12 is arranged at the bottom of the battery box 1, a liquid cooling pipe 11 is arranged under the battery module 2, and the battery box 1 also includes a humidity detecting probe 10, an accumulated liquid absorbing area 8 and a moisture absorbing area 9 are arranged in the battery box 1.

Preferably, the box of the battery box 1 adopts a composite material, so as to obtain better heat preserving and insulating performance, which is hardly affected by the outer cold air environment. The box top cover 3 of the battery box 1 adopts a topological optimizing tool to optimize the design, so that the cold air can be gathered for processing. The flow converging plate 5 is fixedly connected with the box side plate of the battery box 1, the flow converging plate 5 can be designed by the topological optimizing tool according to requirements on the number of converging areas, so that the cooling liquid and the condensation water can converge and aggregate when the liquid cooling pipe 11 is leaking liquid. The flow converging plate 5 is made by stamping metal, such as stainless steel, aluminum alloy, the flow converging plate 5 can also adopt composite material or plastic. The arrangement of the electronic components such as the CSC 6 etc. is that the socket direction is perpendicular to the gravity direction, which can avoid the hot moisture from entering into the electron component units along the gravity direction; the CSC 6 adopts a plastic sealing housing.

The air pressure valve 7 is one of the passages for the battery box 1 to exchange air with the outer environment, and the air pressure balance valve 7 is arranged on the box side plate of the battery box 1. This is the only passage in the battery box of IP67, otherwise, such as the battery box with initiative air cooling has a passage for the outer air to enter into the battery box after being cooled in the evaporator. However, the number of the valves needs to be determined through CFD simulation analysis according to the size of the box and the pressure balance rate. During air exchanging through the valve, the phenomenon that the outer moisture being brought into the interior of the box is difficult to avoid, for example, when a vehicle with a power battery system is moving from a dry high attitude area to humid low attitude area, the external pressure P2 outside the battery box is larger than the internal pressure P1 inside, the moist air will flow into the interior of the box under the effect of the pressure difference (ΔP=P2−P1) between the exterior and the interior, thus causing the air humidity inside the battery box 1 to rise. Therefore, the air pressure balance valve 7 needs the exsiccating and dehumidifying function, besides the only inside-outside pressure balance function, a multi-hole ventilating and moisture absorbing sheet can be arranged. Referring to FIG. 2, the air pressure balance valve 7 includes a multi-hole ventilating and moisture absorbing sheet 71, an air pressure balance valve diaphragm 72, a multi-hole ventilating and moisture absorbing sheet 73 and a dust-removal filtering net 74. The dust-removal filtering net 74 is of a detachable and cleanable structure, so as to facilitate to solve the problem of performance degradation of the component in dustiness environment and to improve conveniences after sale. The dust-removal filtering net 74 is arranged at the outside of the multi-hole ventilating and moisture absorbing sheet arranged towards the outside of the battery box. The multi-hole ventilating and moisture absorbing sheet 71 and the multi-hole ventilating and moisture absorbing sheet 73 are arranged at the front and back of the air pressure balance valve diaphragm 72, the multi-hole ventilating and moisture absorbing sheets located at the front and back of the air pressure balance valve diaphragm 72 can adopt different materials, the multi-hole ventilating and moisture absorbing sheet 71 is arranged towards the outside of the battery box, the multi-hole ventilating and moisture absorbing sheet 73 is arranged towards the inside of the battery box, generally, it is preferred that the absorbing capacity of the multi-hole ventilating and moisture absorbing sheet 71 is larger than the multi-hole ventilating and moisture absorbing sheet 73, so as to significantly reduce the influence from the outer environment to the interior of the battery box.

Referring to FIG. 1, the accumulated liquid absorbing area 8 is arranged at the bottom of the flow converging plate 5, the liquid-moisture absorbing material adopted in the accumulated liquid absorbing area 8 has certain saturability, the accumulated liquid absorbing area 8 and the flow converging plate 5 cooperates together to aggregate the condensation water and the cooling liquid leaked from the liquid cooling pipe. If the liquid amount is large which exceeds the saturability, the water releasing valve 12 will perform releasing, so as to facilitate maintenance after sale.

The moisture absorbing area 9 is designed to have a multi-hole ventilating and moisture absorbing structure adopting the chemical moisture absorbing material particles or a foaming structure with larger interior than surface, so that the structure has characteristics such as high moisture absorbing capacity, less weight, convenient installation and so on. The moisture absorbing area 9 can be arranged at any location in the interior of the battery box 1, preferably the top cover area. Since the top cover is at the top, the condensate water formed on the top cover is easily dropping into the electrical and electronic components.

The humidity detecting probe 10 can acquire real-time humidity data in the battery box 1, so as to control the humidity level inside the box. At the same time, comparing the humidity data acquired from the probe and a humidity controlling warning line, so as to determine whether to enable the initiative moisture removing function or not. The initiative moisture removing function can use the liquid cooling pipe in the battery box 1 together with the heater, to condense the moisture in the battery box 1 into frost or water, which facilitates the accumulated liquid absorbing area 8 to absorb and remove the cooling liquid, and facilitates the moisture absorbing area 9 to absorb and remove the moisture.

The above are only part of the embodiments of the present application, but not all of them, any equivalent variations made by those skilled in the art to the technical solutions of the present application after reading the specification of the present application shall be covered by the claims of the present application.

What is claimed is:

1. A battery pack, comprising a battery box, a battery module and a liquid cooling pipe are arranged inside the battery box, the liquid cooling pipe is arranged at bottom of the battery module, characterized in that: a moisture absorbing area is arranged inside the battery box and the moisture absorbing area is configured to absorb inner moisture of the battery box,
   wherein a flow converging plate is arranged in the battery box and the flow converging plate is fixedly connected with a box side plate of the battery box, and
   wherein an accumulated liquid absorbing area is arranged in the battery box and the accumulated liquid absorbing area is arranged at a bottom of the flow converging plate, liquid and moisture absorbing material adopted in the accumulated liquid absorbing area has certain saturability, and the accumulated liquid absorbing area and the flow converging plate cooperate to aggregate condensation water and cooling liquid leaked from the liquid cooling pipe.

2. The battery pack according to claim 1, characterized in that: the moisture absorbing area is arranged on a box top cover of the battery box, so as to avoid condensation water formed on the box top cover from dropping into electronic and electrical components.

3. The battery pack according to claim 1, characterized in that: a humidity detecting probe configured to detect humidity of the moisture absorbing area is arranged in the battery box.

4. The battery pack according to claim 1, characterized in that: an air pressure balance valve is arranged at a box side plate of the battery box and the air pressure balance valve comprises a multi-hole ventilating and moisture absorbing sheet arranged towards outside of the battery box, a multi-hole ventilating and moisture absorbing sheet arranged towards inside of the battery box, and an air pressure balance valve diaphragm, wherein the multi-hole ventilating and moisture absorbing sheet arranged towards outside of the battery box is arranged at a front of the air pressure balance valve diaphragm, and the multi-hole ventilating and moisture absorbing sheet arranged towards inside of the battery box is arranged at a back of the air pressure balance valve diaphragm.

5. The battery pack according to claim 4, characterized in that: absorbing capacity of the multi-hole ventilating and moisture absorbing sheet arranged towards outside of the battery box is higher than absorbing capacity of the multi-hole ventilating and moisture absorbing sheet arranged towards inside of the battery box.

6. The battery pack according to claim 5, characterized in that: the air pressure balance valve further comprises a detachable dust-removal filtering net configured to absorb and remove dust, the dust-removal filtering net is arranged at outside of the multi-hole ventilating and moisture absorbing sheet arranged towards the outside of the battery box.

7. The battery pack according to claim 1, characterized in that: the moisture absorbing area is integrated as a multi-hole ventilating and moisture absorbing structure, which adopts chemical moisture absorbing material particles or a foaming structure with larger interior than surface.

8. The battery pack according to claim 1, characterized in that: a cell supervision circuit is further arranged in the battery box and a socket direction of the cell supervision circuit is perpendicular to gravity direction.

* * * * *